(12) United States Patent
Sagal

(10) Patent No.: US 8,827,508 B2
(45) Date of Patent: Sep. 9, 2014

(54) OVERMOLDED LED LIGHT ASSEMBLY AND METHOD OF MANUFACTURE

(75) Inventor: E. Mikhail Sagal, Wakefield, RI (US)

(73) Assignee: Thermal Solution Resources, LLC, Narragansett, RI (US)

( * ) Notice: Subject to any disclaimer, the term of this patent is extended or adjusted under 35 U.S.C. 154(b) by 184 days.

(21) Appl. No.: 12/910,340

(22) Filed: Oct. 22, 2010

(65) Prior Publication Data

US 2011/0095690 A1  Apr. 28, 2011

Related U.S. Application Data

(60) Provisional application No. 61/254,127, filed on Oct. 22, 2009.

(51) Int. Cl.
| | |
|---|---|
| *F21K 99/00* | (2010.01) |
| *F21V 15/01* | (2006.01) |
| *F21V 31/04* | (2006.01) |
| *B29C 45/14* | (2006.01) |
| *F21V 29/00* | (2006.01) |
| *F21V 19/00* | (2006.01) |
| *B29C 45/00* | (2006.01) |
| *F21Y 101/02* | (2006.01) |
| *F21V 17/16* | (2006.01) |

(52) U.S. Cl.
CPC ............... *B29C 45/14* (2013.01); *F21K 9/137* (2013.01); *F21V 15/011* (2013.01); *F21V 29/2231* (2013.01); *F21V 29/244* (2013.01); *B29K 2995/0013* (2013.01); *F21V 29/246* (2013.01); *F21V 19/005* (2013.01); *F21V 31/04* (2013.01); *B29C 45/0013* (2013.01); *F21Y 2101/02* (2013.01); *F21V 17/164* (2013.01)
USPC ...................................................... 362/373

(58) Field of Classification Search
CPC ..................................................... B29C 45/14
USPC ................... 313/46; 362/249.02, 373, 294
See application file for complete search history.

(56) References Cited

U.S. PATENT DOCUMENTS

| 4,571,456 A | 2/1986 | Paulsen et al. |
| 4,729,076 A | 3/1988 | Masami et al. |

(Continued)

FOREIGN PATENT DOCUMENTS

| CN | 1535482 A | 10/2004 |
| CN | 101317034 A | 12/2008 |
| CN | 201322207 Y | 10/2009 |

OTHER PUBLICATIONS

International Search Report and Written Opinion of the International Searching Authority dated Jan. 11, 2011, received in PCT/US2011/053721 filed Oct. 22, 2010.

(Continued)

*Primary Examiner* — Karabi Guharay
(74) *Attorney, Agent, or Firm* — McLane, Graf, Raulerson & Middleton, Professional Association

(57) ABSTRACT

In one aspect, an LED lighting apparatus includes an electronic circuit board having a peripheral portion and a central portion that is radially inward of said peripheral portion, said electronic circuit board having an exterior side for optically interfacing with ambient environment during operation and an interior side opposite the exterior side. At least one LED is mounted on the exterior side of the electronic circuit board central portion and a thermally conductive housing encloses said electronic circuit board, said thermally conductive housing formed of a moldable thermally conductive material. The thermally conductive housing defines a first cavity adjacent the central portion of the electronic circuit board exterior side and a second cavity adjacent the central portion of the electronic circuit board interior side, wherein a portion of said thermally conductive housing being overmolded onto said peripheral portion. In a further aspect, a method of manufacturing an LED lighting apparatus is provided.

27 Claims, 12 Drawing Sheets

(56) References Cited

U.S. PATENT DOCUMENTS

| | | | |
|---|---|---|---|
| 5,038,255 A | 8/1991 | Nishihashi et al. | |
| 5,289,342 A | 2/1994 | Spalding et al. | |
| 5,430,609 A | 7/1995 | Kikinis | |
| 5,632,551 A | 5/1997 | Roney et al. | |
| 5,818,693 A | 10/1998 | Garner et al. | |
| 6,026,888 A | 2/2000 | Moore | |
| 6,147,301 A | 11/2000 | Bhatia | |
| 6,318,886 B1 | 11/2001 | Stopa et al. | |
| 6,367,949 B1 | 4/2002 | Pederson | |
| 6,375,340 B1 | 4/2002 | Biebl et al. | |
| 6,435,459 B1 | 8/2002 | Sanderson et al. | |
| 6,481,874 B2 | 11/2002 | Petroski | |
| 6,487,073 B2 | 11/2002 | McCullough et al. | |
| 6,881,980 B1 | 4/2005 | Ting | |
| 7,192,163 B2 | 3/2007 | Park | |
| 7,252,407 B2 | 8/2007 | Lewis | |
| 7,448,770 B2 | 11/2008 | Catalano et al. | |
| 7,677,766 B2 | 3/2010 | Boyer | |
| 7,993,025 B2 * | 8/2011 | Chiu | 362/249.02 |
| 2002/0141197 A1 | 10/2002 | Petroski | |
| 2002/0159235 A1 | 10/2002 | Miller et al. | |
| 2006/0098308 A1 | 5/2006 | Angelini et al. | |
| 2006/0103589 A1 | 5/2006 | Chua et al. | |
| 2007/0121326 A1 | 5/2007 | Nall et al. | |
| 2009/0016063 A1 | 1/2009 | Hu | |
| 2009/0086476 A1 | 4/2009 | Tickner et al. | |
| 2009/0097249 A1 | 4/2009 | Lee et al. | |
| 2009/0129086 A1 | 5/2009 | Thompson, III | |
| 2009/0147518 A1 | 6/2009 | Shuai et al. | |
| 2009/0161356 A1 * | 6/2009 | Negley et al. | 362/231 |
| 2009/0219713 A1 * | 9/2009 | Siemiet et al. | 362/218 |
| 2009/0251864 A1 | 10/2009 | Saga et al. | |
| 2009/0296387 A1 | 12/2009 | Reisenauer et al. | |
| 2010/0027261 A1 | 2/2010 | Yashima et al. | |
| 2010/0046221 A1 | 2/2010 | Posselt et al. | |
| 2010/0067227 A1 | 3/2010 | Budike | |
| 2010/0084979 A1 | 4/2010 | Burton et al. | |
| 2010/0103675 A1 * | 4/2010 | Yu et al. | 362/253 |
| 2011/0292612 A1 * | 12/2011 | Osenbach et al. | 361/719 |

OTHER PUBLICATIONS

European Search Report received in EP 10825734.6 dated Jul. 24, 2013.
English Abstract of Chinese Utility Model CN 201322207Y (Oct. 7, 2009).
Communication under Rule 71(3) EPC dated Mar. 28, 2014, received from the European Patent Office in EP10825734.
Office Action Issued by the State Intellectual Property Office of China dated May 13, 2014, in CN201080047114:1.

* cited by examiner

OVERMOLDED LED LIGHT ASSEMBLY AND METHOD OF MANUFACTURE

CROSS-REFERENCE TO RELATED APPLICATION

This application claims the benefit of priority under 35 U.S.C. §119(e) based on U.S. provisional application No. 61/254,127 filed Oct. 22, 2009. The aforementioned provisional application is incorporated herein by reference in its entirety.

BACKGROUND

The present disclosure relates generally to the design, assembly, and manufacture of LED lamps and luminaires. In one aspect, the present disclosure relates to an improved LED lamp or luminaire having an overmolded LED circuit board. In another aspect, the present disclosure relates to a manufacturing method employing automation and in-mold assembly techniques during the injection over-molding of one or more of its utilized components.

LED lighting is fast becoming the desired lighting device of choice in commercial applications, municipal and government applications such as roadway and parking structure lighting and retail applications such as spot lighting and directional illumination. Compared with traditional light sources such as incandescent and fluorescent lighting devices, they have many advantages such as lower power consumption, much longer life (e.g. 50,000 hours) and no mercury or other hazardous materials in them.

Consumer household replacement lighting is an area in which LEDs are desired, but difficult to adopt because of relatively high manufacturing and component costs and problems with reliability and manufacturing repeatability. First costs of an LED replacement lamp are still upwards of 10 times that of traditional incandescent and fluorescent light bulbs. Additionally, quality issues still remain driven by assembly techniques and component and material selection. Furthermore, the advantages of long life and low power consumption are attainable only if the LED light source is kept sufficiently cool.

LED light sources generate significant thermal energy which, if not removed or managed, may prevent proper functioning, or limit the lifetime, of the source. Thermal interface and junction resistances between the heat generating LED light sources and the heat sinks of the LED lamp designed to dissipate the heat can add anywhere from 1-10 degrees Celsius or more to the LED junction temperature. Maintaining this junction temperature at or below the LED light source manufacturer's specifications is critical for the life of the LED and the lower the temperature the longer the life. According to accepted electronic design rules, for every 10 degrees Celsius temperature reduction there is a doubling of the electronic life.

Additionally, assembly of the LED lamp can significantly affect device performance, product life and product cost. In conventional hand assembly and semi-automated processes, part-to-part consistency is difficult to maintain and part-to-part reliability is compromised—especially when thermal performance is the key to success and long life for any LED lamp and poor thermal design and heat management is employed. Today's LED lights are being manufactured in component and mechanically intensive processes because of the general unfamiliarity with LED luminaire components (LEDs, drivers/power supplies, heat sinks and thermal management, optics and lenses) or with best practices for designing and assembling them together for reliable product utilization. In an LED lamp, the following manufacturing steps and components are generally needed: The heat sink to dissipate heat from the LED light source and other electronics has to be manufactured. In LED lamps and luminaires the heat sink is generally part of the housing of the product. The LED circuit board assembly has to be fabricated with all of its components including the LED light sources. This is generally done by soldering the LED light sources and any other components to traces on a PCB. In high power LED lighting, generally, the PCB is a metal core printed circuit board (MCPCB); however, other materials are used as well and in almost all cases are attached to the heat sinks and are used to conduct the heat from the LED light source to the heat sink through a thermal interface. The LED circuit board assembly has to be mounted to the heat sink. Thermal interface must be placed between the heat sink and the LED circuit board. The driver board and electronics have to be fabricated and assembled and then installed in the LED lamp. The driver board and electronics power the LED by constant current and ensure the operation of the LED light sources. The driver board is wired and assembled to the LED circuit board assembly via soldering and other connections (in some cases the drive electronics and components are mounted on the same circuit board assembly as the LED lighting devices). A lens must be manufactured and mounted to the top of the LED circuit board and in front of the lamp to focus the light from the LED light sources to the desired beam angle and intensity. A GU or Edison or other lighting industry standard connector must be wired and assembled to the drive electronics to connect the LED device to power sources. All of these assembly steps and techniques involve screws, glues, wires, soldering steps, additional parts for holding parts together and the requirement of manual labor to put everything together.

FIG. 1 illustrates an exemplary prior art LED lighting lamp employing a heat sink/housing in thermal communication with the LED circuit board and LED light source so as to provide cooling by dissipating heat into the ambient air. Connected to the LED circuit board and assembled within the LED device is the drive electronics board and connector on one side as well as the LED lens on the other.

FIG. 1 shows an exemplary LED lamp 110 having a heat sink housing 118. The housing 118 may be formed of a thermally conductive material, such as a metal or metal alloy or a thermally conductive plastic. A heat spreader plate 128 is overmolded by the thermally conductive material during an injection molding process. A drive electronics board 111 with connector attached is then physically inserted into heat sink housing 118 and mechanically screwed to the heat spreader plate 128 with connecting screws 129. A thermal interface material 131 is then mounted onto the heat spreader plate 128. Next a circuit board assembly 116 with one or more LED light sources 117 on it is physically attached to the lighting lamp 110 by placing it against the thermal interface 131 and screwing it to the heat spreader plate 128 with screws 129a. A light lens/optics 119 is then placed against the circuit board 116 and held in place by a lens cover or bezel 130 (or alternative fastener such as glue or adhesive), which is mechanically fastened to the heat sink housing 118 to hold the lens in place. An Edison or GU connector 112 is then wired to the end of the LED device 110 and attached to the drive electronics board 111.

Designing and manufacturing heat sinks for LED lamps and luminaries is not new and has been done with a number of materials to date, including thermally conductive plastics, aluminum extrusion, die casting etc. The method to manufacture the thermally conductive plastic heat sinks is typically injection molding, though other methods of forming and creating polymer shapes out of various types of polymers, epoxies and thermosetting materials is well known in the industry and injection molding process is being used as one example. All current and previous LED lights utilize a separately manufactured heat sink and then assemble the LED circuit board to the heat sink using screws, glues or other assembly mechanisms along with a thermal interface. Some products and designs do not even use a thermal interface, creating significantly poor performing products.

As a result of the lower power consumption and longer life of LED light sources, compared to traditional light sources, today's lighting market and governments worldwide are utilizing and promoting the use of high power LEDs. With government and market support, LEDs are gaining wide acceptance and adoption into mainstream lighting applications. As the global lighting requirements are continuously growing, LEDs are enabling emerging markets and underdeveloped areas to use light sources because of the low power consumption and ability for LEDs to be powered by solar energy as well as last a long time without replacement. Still, the biggest hurdle to LED lighting used in residential as replacement light bulbs on a massive scale, is the first cost to the consumer and the thermal reliability and manufacturing repeatability/cost of the lights. The Department of Energy is continuously pushing the development of LED replacement bulb devices that are energy and thermally efficient yet have the same first cost as traditional incandescent and fluorescent light bulbs.

The present disclosure describes an improved LED device design and method of fabricating the same.

SUMMARY

The present disclosure uses thermally conductive moldable material as the integral heat sink for the LED device to reduce or eliminate the junction resistance between the heat sink and the LED circuit board by using the injection molding process to overmold the thermally conductive material directly onto the greater periphery of the LED circuit board, leaving an opening in the back side center for the driver electronics to be connected to the circuit board and an opening in the front, exposing all of the LED's so that a secondary optic may be attached to focus the light as desired. This not only mechanically fastens the LED circuit board to the housing without screws or secondary attachment techniques, but also reduces or eliminates any thermal junction resistance between the circuit board and the heat sink housing due to the thermally conductive material completely wetting out the surface contact area between the circuit board and the heat sink housing during the overmolding. It also eliminates the need for a thermal interface between the heat sink and the circuit board, significantly improving thermal performance (lower temperature) and thereby increasing product reliability. Eliminating or reducing junction resistance by eliminating the thermal interface also reduces cost by reducing manufacturing steps and components used.

The present innovation will be described herein primarily by way of reference to the preferred embodiment wherein the heat sink housing is formed of a thermally conductive plastic, however, other moldable thermally conductive materials may also be used, such as a metal injection molded material.

In one aspect of this disclosure, an LED lighting device includes a circuit board including one or more LED lighting elements thereon and a housing member containing the circuit board, the housing member formed of a thermally conductive, molded material, said housing member thermally coupled to said LED lighting elements, wherein the housing member is formed by over-mold directly onto a peripheral edge portion of the circuit board.

In another aspect, a light emitting diode lighting device made up of component modules that can be snapped together using thermally conductive plastic as the integrated and overmolded heat sink that one or more additional component modules snap into and/or onto.

In yet another aspect, a method of forming an LED lighting device comprised encapsulating a light emitting diode circuit board within a thermally conductive housing during an injection molding operation using plastic or metal, preferably thermally conductive plastic, to thereby form a heat sink for the LED device and eliminate or reduce the junction resistance between the heat sink and the LED circuit board device. In a more limited aspect of this disclosure, one or more mechanical fastening means are formed on the housing during the injection molding operation for attaching one or more additional components or modules comprising the light emitting diode device.

This overmolded assembly of the heat sink housing overmolded directly onto the LED circuit board may then be taken as one simple subassembly and may be assembled with any other necessary components, e.g., optics and drive electronics to form a complete LED lighting product. Because no electronic components with exposed live circuit elements are being directly overmolded, there is no possibility of shorting out any components. It is therefore possible in this disclosure, to use thermally conductive plastics that are also electrically conductive as the heat sink housing material. These materials are available in higher thermal conductivities than materials that are electrically non-conductive, delivering better thermal performance. With no risk of overmolding live components in the disclosed design, there is no need for further isolation requirements of any components or the circuit board above and beyond their typical fabrication techniques.

In a further preferred use, the LED apparatus and method of the present disclosure may use modular LED component assemblies that all snap and fit together quickly and integrally. That is, the thermally conductive plastic heat sink housing may serve as both the integral heat sink for the LED device as well as the mechanism that assembles and holds all the components of the LED device together. It uses an injection molding process to mold the thermally conductive plastic and forms it as the mechanical feature that is the heat sink as well as the mechanical component that holds everything together. It uses the injection molding process to overmold the thermally conductive plastic directly onto the LED circuit board, which not only mechanically fastens the LED circuit board to the housing without the need for screws or secondary fasteners or techniques, but also reduces or eliminates thermal resistance between the circuit board and the heat sink housing because it completely wets out the surface contact area during overmolding. It also avoids the need for a thermal interface between the heat sink and the circuit board, significantly improving thermal performance (lower temperature) and further increasing product reliability.

The injection molding process may also be used as the assembly method to assemble the entire LED lighting device module and sub assemblies together during the injection molding process cycle. In some cases, the LED lighting device can be assembled in the same molding cell while the thermally conductive plastic housing heat sink is being overmolded onto the LED circuit board, e.g., by incorporating automation techniques and robotics. This produces an assembled LED lamp that is thermally and mechanically reliable with minimal to no added manufacturing costs and time. The manufacturing process from device to device can thus be made consistent and repeatable which again increases device and product reliability and repeatability. This automated assembly can therefore significantly reduce manufacturing and assembly time and costs of the LED lamp. The combination of these factors significantly reduces the device first cost to the consumer.

By using the injection molding process to assemble the heat sink to the LED circuit board module through overmolding, previous costly and thermally unreliable assembly methods can be eliminated. The LED circuit board module, in which all of the LED light sources and electronics may be pre-populated thereon, is inserted into the mold cavity that molds the thermally conductive plastic heat sink housing. The heat sink is then overmolded onto the LED circuit board creating a subassembly of the heat sink and LED circuit board in one operation that has little or no thermal junction resistance between the PCB and the heat sink housing and requires no thermal interface.

In another aspect, the components that make up the LED lighting device are designed in such a way that they are all modular and have quick connect features so they can be efficiently assembled together. The drive electronics board module with connector/socket for mounting the LED device to a light fixture may be designed in such a way that it has a second connector at one end that quickly connects into a mating connector through the greater central area on the back of the LED circuit board module. The LED lens, when required or desired, may be designed so that it too has snap features that can quickly assemble to the LED lighting device through the front of the lighting device module.

In a further aspect, all of these components are assembled together as modules during the injection molding process of molding the heat sink, delivering a completely assembled lighting product within one manufacturing operation. All components are inserted into the molding cell. The thermally conductive plastic is overmolded onto the LED circuit board to create a sub assembly module of the LED circuit board module and heat sink. The drive electronics are then snapped or connected in place to the sub assembly module by connecting to a connector in the LED circuit board, and lastly the lens or cover, if required or desired, is connected to the LED sub assembly module by snapping onto the front of the thermally conductive molded heat sink. The result is a modular designed LED device that is manufactured in a manner that produces a low cost, thermally reliable device with significant advantages over prior art LED devices in the cycle time required to produce one assembly.

One significant advantage of the current development is the ability to eliminate manual labor and the associated reliability and assembly costs of assembling the heat sink to the LED circuit board with screws and glues and incorporating a thermal interface between the two. A second advantage resides in the ability of the present innovation to eliminate the need to assemble the drive electronics and components to the heat sink housing and LED circuit board with further screws and attachment components. A third advantage is that it can allow for the elimination of the need to assemble the LED lens/cover to the LED circuit board or heat sink housing, and/or other combinations of manual assembly manufacturing techniques used in conventional LED light manufacturing processes, as well as the labor cost to assemble all the remaining components together.

Another advantage is the repeatability of the current development over previous assemblies. By overmolding the thermally conductive plastic onto the LED circuit board as the assembly method, it reduces or eliminates the thermal junction resistance between the circuit board and heat sink and utilizes the automated and repeatable process of injection molding to do so. There is no opportunity to forget to apply a thermal interface tape or grease. There is no opportunity to under tighten screws when attaching components together. There is no opportunity for misalignment or bad fit due to poor manufacturing quality. The injection molding process all occurs within a molding cavity which is fixed in size and shape. The LED circuit board is inserted into the injection molding cavity in such a way that the area to be overmolded is exposed within the cavity while the other areas are sealed from the cavity. Thermally conductive plastics are then injected into the open cavity filling the area, overmolding the desired area of the LED circuit board and forming the overall size, shape and part of the overmolded heat sink housing.

Yet another advantage of the present disclosure is the design of the molded heat sink. By designing the heat sink to conform to plastic injection molding design for manufacturing (DFM) assembly techniques, advanced automated, semi automated and even secondary hand assembly can truly be taken advantage of in a repeatable and effective manner. The heat sink can have snap features, ribs, guides, posts, tabs or any other mechanical feature that can be designed to be molded into it. This allows for easily attaching other modules or components such as the lens, bezels or drive electronics directly to the heat sink housing. The overmolded heat sink is designed in such a way that it is the anchor or fastening body that everything else quickly and easily mounts to—without the need for any secondary or extra mounting hardware or materials such as glue.

Still a further advantage of the current disclosure is the modular design of the LED lighting device. The ability to make some or all of the components that are to be assembled together modularly allows the present LED lighting device design to be simplified and system costs reduced. Instead of complete LED lighting devices being their own complete and custom solutions, each module within the lamp design can become its own standardized form factor allowing these independent module supplier/manufacturers to compete to supply product. By making the modules standard form factors, manufacturers only have to focus on one aspect of the product development. This allows further product cost reductions and manufacturing efficiencies when producing these modules. These module manufacturers/suppliers would in turn publish specifications on their particular modules that supporting module suppliers (lens/cover or drive board electronics manufacturers) would ensure that their ancillary modules snap/fit together easily and efficiently. Currently there are many standards for defining light safety, electronics regulation as well as lighting form factor such as IEC 60630. IEC 60630 governs the form factor requirements for any lamp product manufactured or sold so as to simplify product development and create a standard for shapes for fixture manufacturers and designers. The modular LED device design of the present disclosure, in a similar fashion, has the potential to standardize the manufacturing process and modular design form factors in a way in which the heat sink housing form factors are determined, board sizes and modules are predetermined, lens/cover options are pre-defined and overmolding of the LED circuit board in LED product design becomes the norm. This not only increases reliability in the device, it focuses all reliability factors down to just a few critical areas such as electronic design, LED light source selection and electronics component quality. It also allows for easy replacement and exchange should there be any warranty or upgrade aspects to these LED lighting products.

Another advantage of the current development resides in the manufacturing method of assembling the modular LED device modules together such as the assembly of the drive electronics and connector board to the LED lighting device as well as to the LED lens (if required) all while injection molding the thermally conductive heat sink housing to the LED circuit board module. The advantage of and the automated options related to injection molding, turn complex assemblies of components and modules into an easily automated assembly process that can be completely done inside the injection molding cell, in close proximity to it or off-line if required, but preferably inside of the injection mold itself by molds that are designed to mechanically automatically assemble components together. This can be done by two shot injection molding (e.g., the lens/cover may be molded in place), or by automated robots and equipment built into the molding cell, all using components designed to be quickly assembled together. In summary, the whole assembly process may be done within the injection molding cycle of first injection molding the heat sink housing onto the LED circuit board module and then assembling all remaining components/modules to the housing—which thereby adds no additional cost and makes it extremely reliable and cost effective.

Still further benefits and advantages of the present development will become apparent to those skilled in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
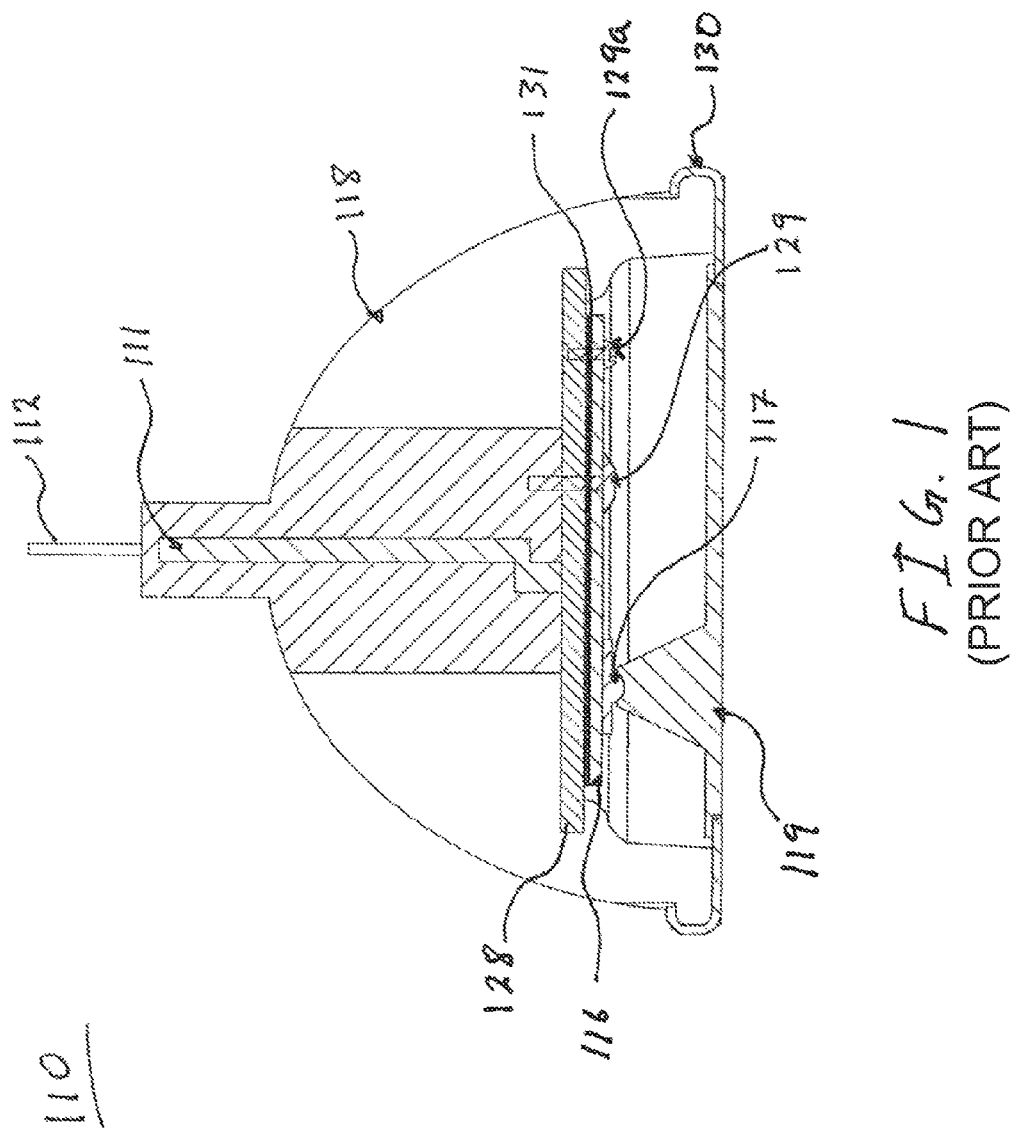
FIG. 1 is a cross-sectional view of an exemplary prior art LED lighting device.
Figure 2:
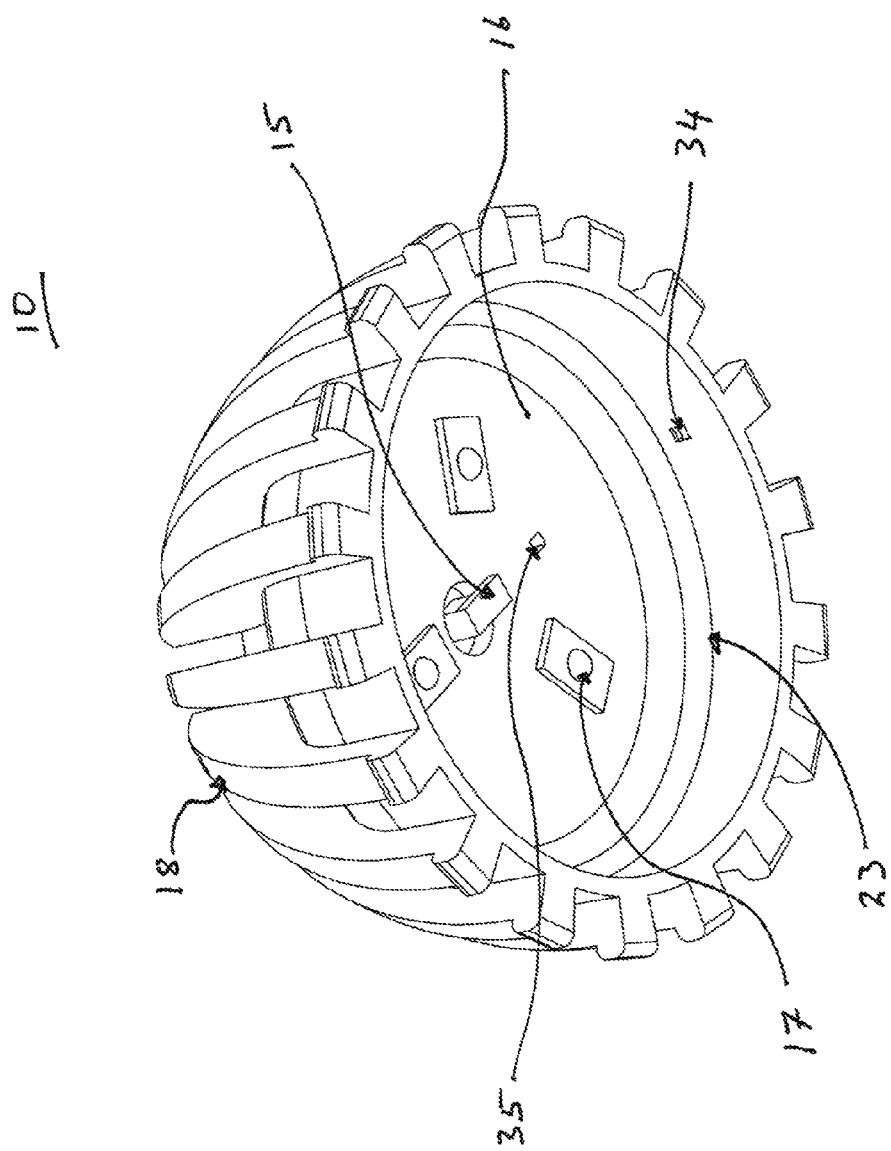
FIG. 2 is a first isometric view of an exemplary embodiment overmolded heat sink housing assembly overmolded directly onto an LED circuit board module.
Figure 3:
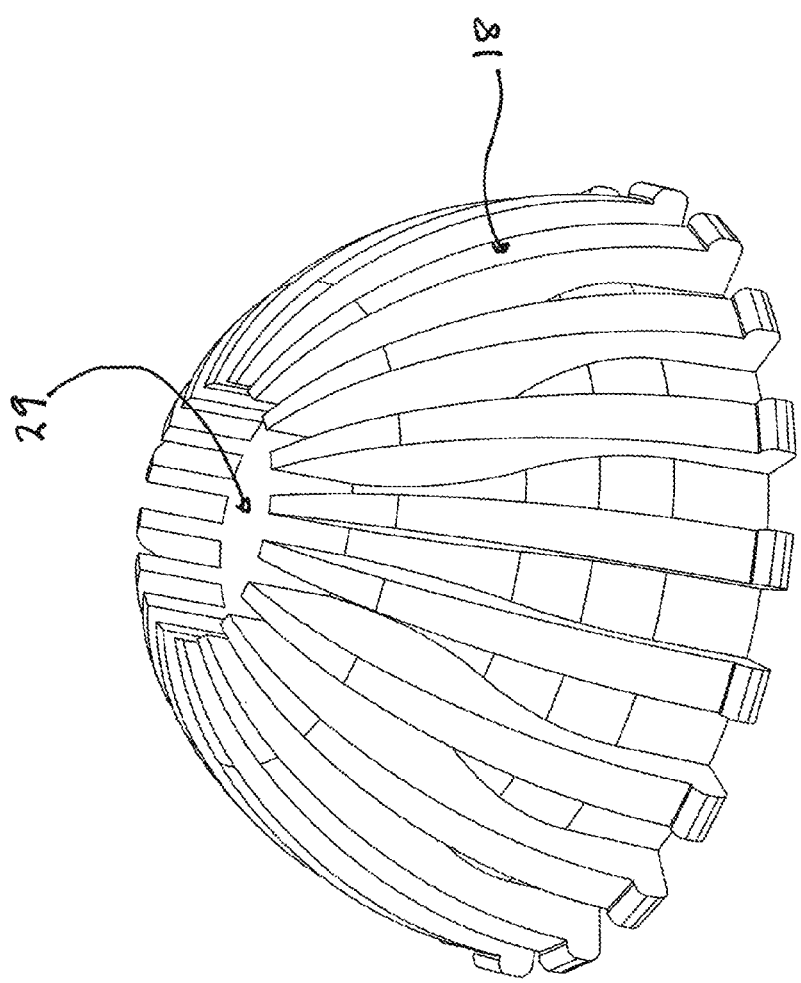
FIG. 3 is a second isometric view of the overmolded heat sink housing assembly appearing in FIG. 2.
Figure 4:
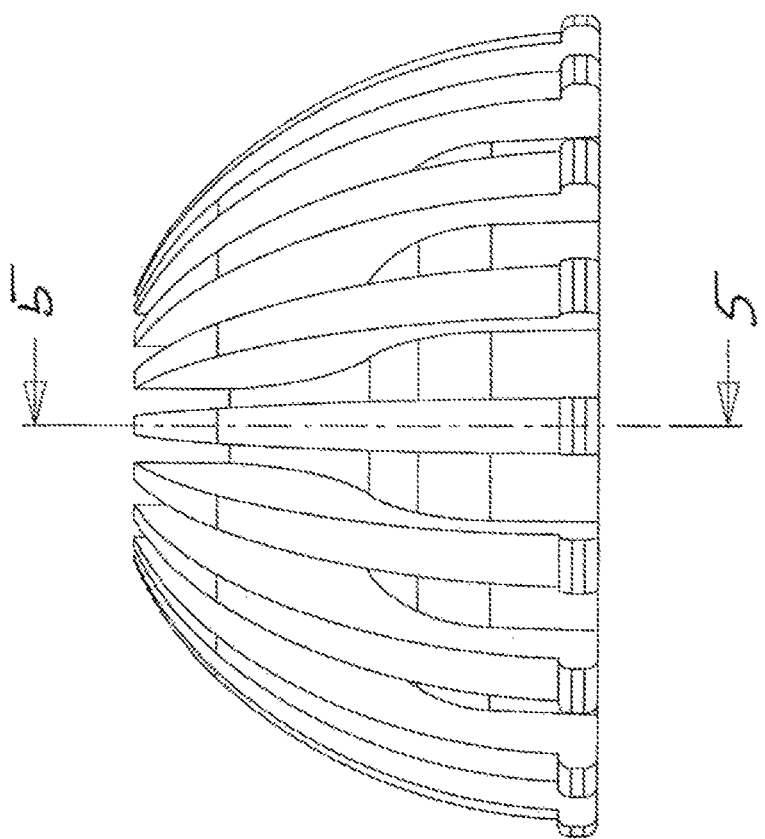
FIG. 4 is a side view of the overmolded heat sink housing assembly appearing in FIG. 2.
Figure 5:
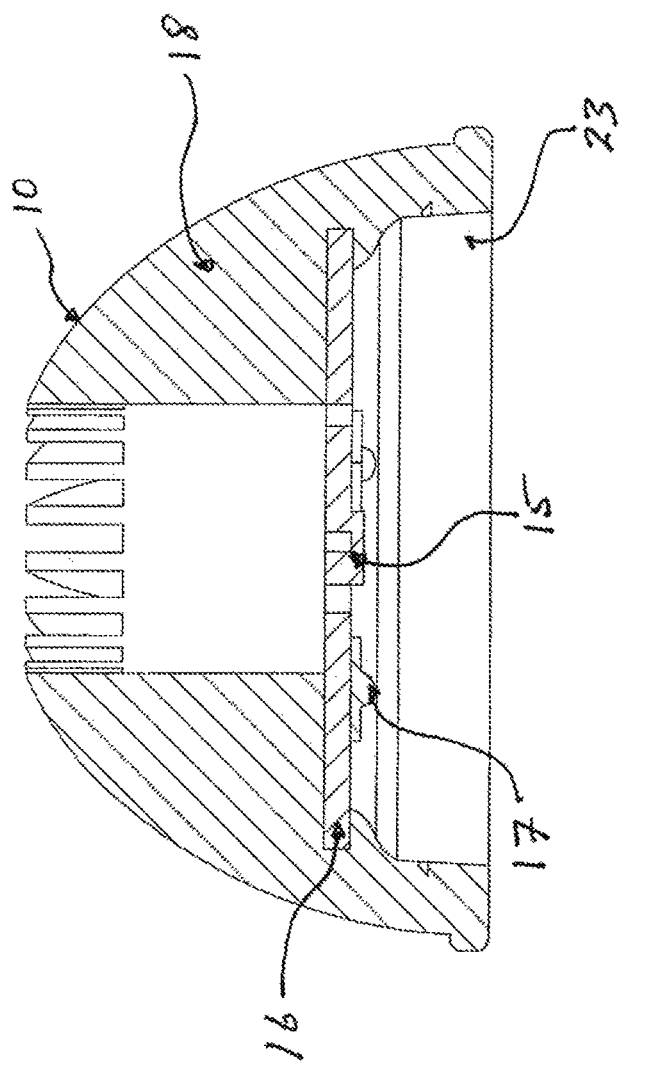
FIG. 5 is a cross-sectional view taken along the lines 5-5 in FIG. 4.
Figure 6:
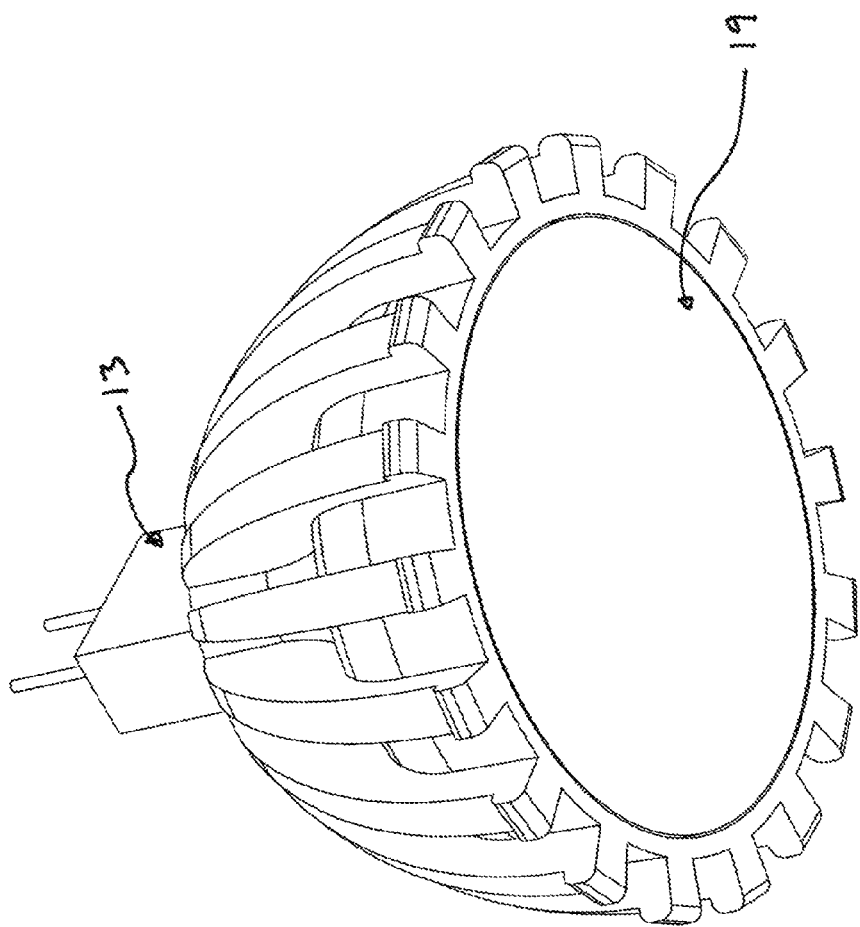
FIG. 6 is a first isometric view of an assembled LED lighting device employing the overmolded heat sink housing assembly of FIG. 2.

Referring to the drawings, wherein like reference numerals refer to like or analogous components throughout the several views, particular reference is now made to FIGS. 2-5 wherein there appears an LED circuit board 16 with an overmolded heat sink housing 18 and FIGS. 6-9 wherein there appears an assembled LED lighting apparatus 10. Preferably, the LED circuit board is pre populated with the LED elements prior to overmolding the heat sink housing 18, however, it will be recognized that the LED circuit board could be overmolded prior to mounting the LED elements.

As used herein, the term "overmold," and variants thereof such as "overmolding," "overmolded," etc., when used as a verb, are intended to refer to a molding or casting process, preferably injection molding, in which the LED circuit board is placed within the heat sink housing mold cavity and the thermally conductive moldable material is molded onto or over the LED circuit board in situ. Likewise, the term "overmold," and variants thereof such as "overmolding," when used as a noun, are intended to refer to a molded or cast component produced by an overmolding process as defined above.

The housing 18 may be formed of an injection moldable thermally conductive material, such as a metal or metal alloy (e.g., a metal injection moldable material) or, more preferably, a thermally conductive plastic or polymer material, such as a thermally conductive composite material comprising a polymer matrix and a thermally conductive filler. The housing 18 thus acts as both a housing and a heat sink.

The thermally conductive plastic preferably has a minimum thermal conductivity of 2 W/mK. In preferred embodiments, the thermal conductivity of the moldable thermally conductive material used for the housing 18 is in the range of about 10-15 W/mK, and more preferably in the range of about 15-20 W/mK, or higher.

The thermally conductive polymer material forming the housing 18 is not limited to any particular matrix material. Any suitable matrix material may be employed. The matrix material may be, for example, thermosetting materials such as epoxy resins or polyester resin. It may be for example elastomeric or rubber materials including, but not limited to butadiene-acrylonitrile copolymers, rubber, copolymers, styrene-butadiene copolymers, styrene-maleic anhydride copolymers, and so forth. More preferably, the matrix material is a thermoplastic material based on, for example, acrylonitrile butadiene styrene (ABS) copolymers, aromatic polycarbonates, aromatic polyesters, polyphenylenesulfide, and polyamides. The forgoing list is intended to be exemplary only and other matrix materials, as would be known to those skilled in the art, may also be employed.

Examples of thermally conductive filler or additive materials include, for example, copper flakes, graphite including natural and synthetic graphite, expanded graphite, carbon fiber, carbon black, pitch based carbon fibers, metal nitrides such as aluminum nitride, boron nitride, silicon nitride, silicon oxide, metal oxides such as aluminum oxide, and the like. The thermally conductive filler content by weight in the matrix will usually be from about 5 percent to about 70 percent, preferably from about 25 percent to about 50 percent.

Any other conventional additives may optionally be present in the matrix system which include, but are not limited to, flame retardants, catalysts, promoters, or hardeners, such as curing or cross-linking catalysts or catalysts to promote the growth of conductive materials, fillers such as quartz powder to reduce thermal expansion or other relatively inert materials which may be added to reduce cost, or other fillers or extenders used to modify mechanical properties, serve as a base for color effects, or to improve surface texture, extenders, or to dilute or extend high cost resins without significant lessening of properties, inhibitors, thixotropic agents, adhesion promoters, any other additive capable of exerting a positive effect on the substrate and during processing such as finishing agents to improve matrix to filler coupling or a noble metal or noble metal compound to make the material catalytic for electroless deposition of copper, and so forth. Such additives and their use are generally known to those skilled in the art.

Figure 7:
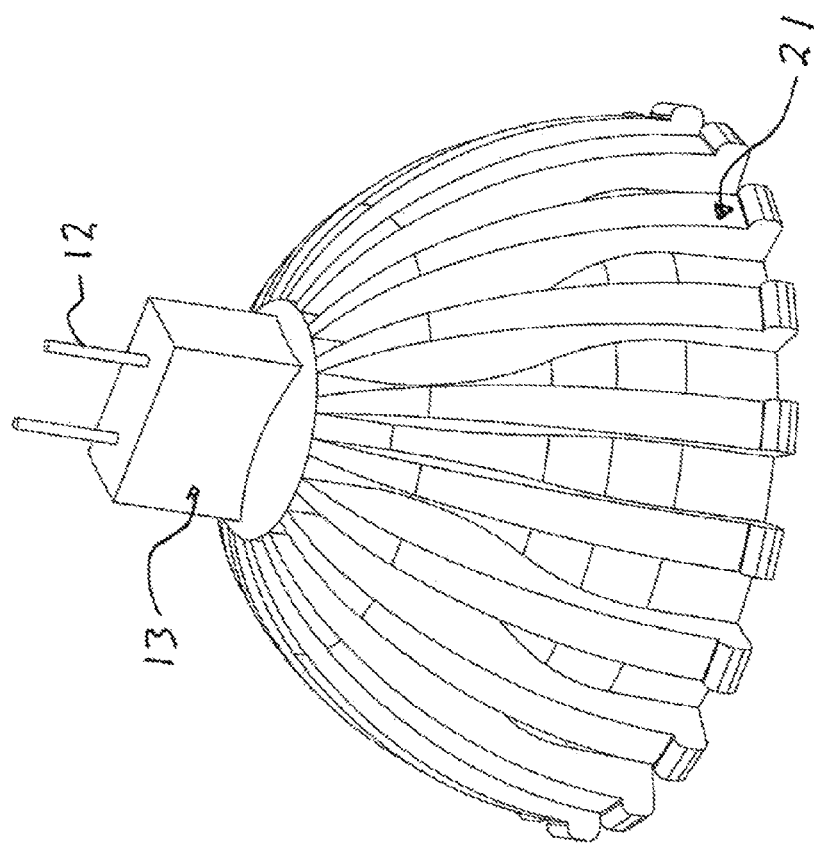
FIG. 7 is a second isometric view of the assembled LED lighting device appearing in FIG. 6.
Figure 8:
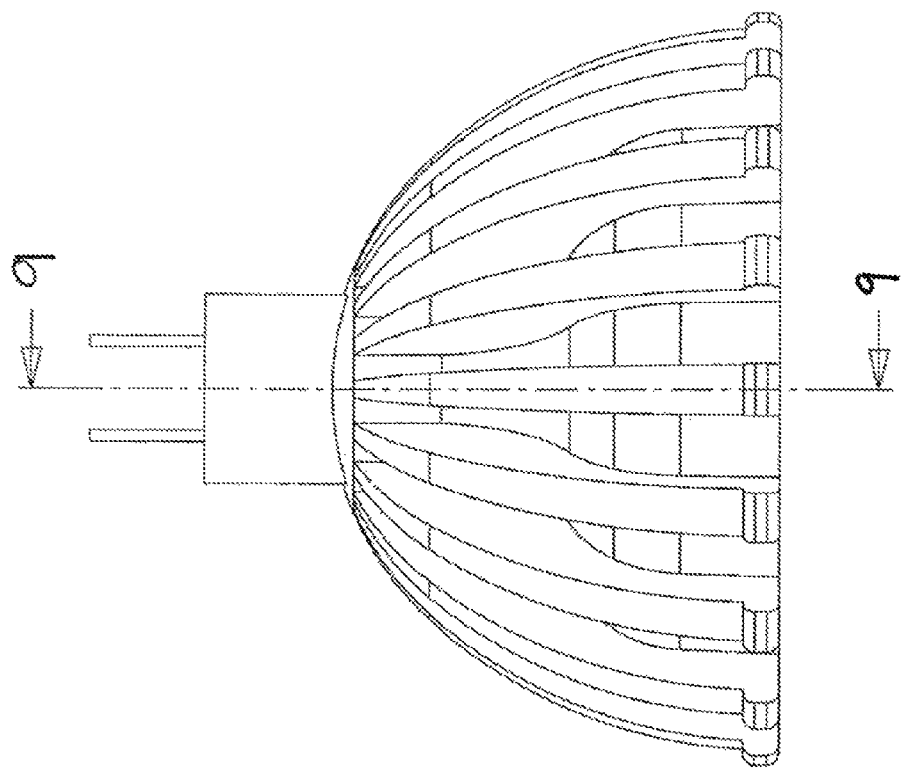
FIG. 8 is a side view of the assembled LED lighting device appearing in FIG. 6.
Figure 9:
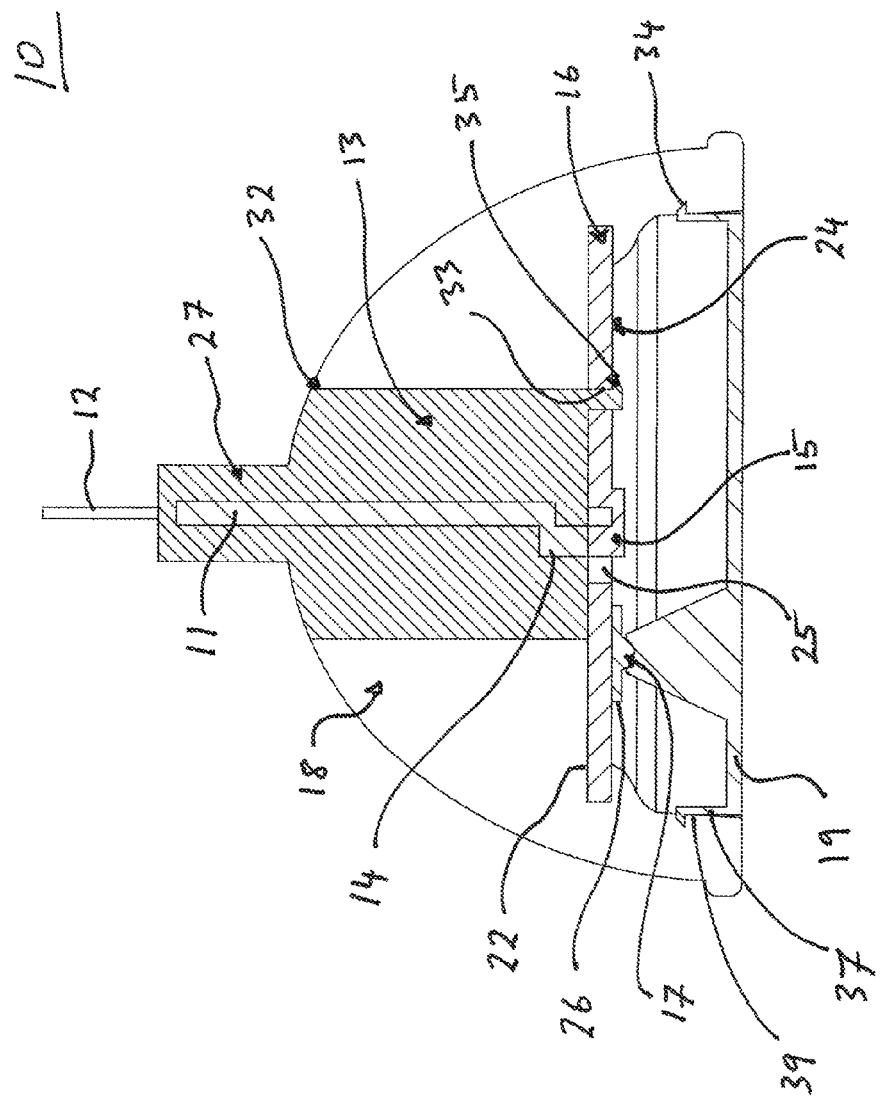
FIG. 9 is cross-sectional view taken along the line 9-9 in FIG. 8.

A series of fins or ribs 21 as shown in FIG. 7 are provided to increase the surface area of the heat sink/housing member 18 to enhance the dissipation of heat to the ambient air. It will be recognized that other geometric configurations for increasing the surface area of the housing/air interface, such as pins or other protrusions, etc., may be provided instead of fins. A lens covering 19 may be provided to cover the open end 23 of the heat/sink housing 18. The lens may be, for example, a transparent cover, and may optionally include integral optical elements, such as a diffuser, beam shaping elements, and so forth. In the depicted preferred embodiment, the lens 19 includes a plurality of legs 37 each having a protrusion 39 which engage a corresponding aligned opening or depression 34. In the illustrated embodiment, the legs are resilient and include a ramped or inclined surface to facilitate insertion of the lens cap into place, while preventing or resisting removal of the lens 19 once it has been snapped into place.

One or more LED elements 17 (three in the depicted embodiment) are mounted on the circuit board 16, e.g., a printed circuit board, which in turn is overmolded within the heat sink/housing 18. The electronic circuit board 16 includes an outer, peripheral portion and an inner, central portion that is disposed radially inward of the peripheral portion. The electronic circuit board 16 also includes an exterior side 24 which optically interfaces with the ambient environment during operation of the LED lighting apparatus and an interior side opposite the exterior side. The LED elements are mounted on the exterior side of the central portion of the circuit board 16. The thermally conductive housing 18 encloses the electronic circuit board and defines a first cavity 23 adjacent the central portion of the electronic circuit board exterior side and a second cavity 29 adjacent the central portion of the interior side of the electronic circuit board 16, such that a portion of said thermally conductive housing is being overmolded onto the circuit board 16 peripheral portion.

The circuit board 16 includes a connector 15 for electrically coupling the LED to an external power supply such as the power supply (AC mains) of a building, a DC drive electronics circuit board module 13, etc. The circuit board 16 and/or the LED driver board 11 embedded inside the driver board module 13 may also carry any other electronics associated with the LED device 10, as would be understood by persons skilled in the art. The circuit board 16, connector 15, LED elements 17, and any other associated electronics make up the LED circuit board module 16.

The circuit board 16 may be, for example, a glass/epoxy printed circuit board or a thermally conductive extrudable or injection moldable polymer. More preferably, the circuit board 16 may be an aluminum or other metal core printed circuit board (MCPCB) of a type that may advantageously be used to conduct heat away from the LED element 17. In the case on a non-metal PCB 16, the conductive layer may be employed to conduct the heat from the LED to the heat sink housing 18. More preferably, in the case on a non-metal circuit board 16, the circuit board 16 may be overmolded in conjunction with a heat spreader plate on the interior side of the circuit board 16 and in thermal communication with the LED elements 17 to conduct the heat away from the LED elements to the heat sink housing 18.

By encapsulating the outside or peripheral edge of the circuit board 16 with the injection moldable thermally conductive material forming the enclosure 18, either partially or completely, with the thermally conductive material forming the enclosure, just leaving a gap for the electronic connection between the circuit board connector 15 and connection to the external power supply, the junction resistance between the circuit board 16 and the housing heat sink 18 can be reduced or eliminated.

During the overmolding process of the circuit board 16, the injection moldable material is in a thermoplastic or soft or liquid phase. This allows the material to completely wet out the surface onto which it is being overmolded. When it solidifies in the mold in its final enclosure shape 18 the resulting contact resistance between the circuit board 16 and the thermally conductive enclosure 18 is reduced or eliminated. This avoids the need for a secondary thermal interface 131 as depicted in FIG. 1 and increases long-term thermal reliability as well as decreases assembly-to-assembly thermal variability.

The electrical connector 15 is electrically coupled to the bottom face 24 of the circuit board 16 and exits through out the back of the circuit board 16 through a hole 25 in the circuit board 16 for electrically coupling the circuit board module 16 to a power grid, drive electronics module 13, secondary power connector, line voltage from the light power supply, light fixture, or other device for delivering power to the LED elements 17 and the circuit board 16, or the like.

In a preferred embodiment, the LED device 10 includes a drive electronics module 13 that snaps together with the LED device 10 during the injection molding assembly process and connects to the circuit board module 16 via a connector 14 on the drive electronics module board 11 and connecting to connector 15 on the circuit board module 16. In this preferred embodiment, alignment grooves or keyed arrangements 32 are molded into the heat sink housing 18 which help guide, locate and secure the driver board module 13 in place during assembly. Such keyed arrangement could include, for example, a rib or protrusion which engages a complimentary groove, an eccentric or otherwise, mating geometric shape of the cavity 23 walls relative to the shape of the drive electronics module 13 to be received within the cavity 23, and so forth. The illustrated and discussed embodiments are exemplary and explanatory only and other configurations of the drive electronics module 13 and its modular assembly into the LED device 10 are contemplated. It will be recognized that any configuration of a self-contained driver electronics module 13 providing a means by which power delivery and conversion is done in a modular fashion may be employed. A modular driver electronics board assembly 13 is also advantageous for manufacture of a completed lighting device in a closed cell manufacturing method.

The driver board module 13 is made up of a circuit board 11 and a connector/drive board module housing material 27 to protect the users and consumers of the LED device 10 from electrical shock from the line voltage and power supplied to the LED device 10. Preferably, the housing 27 of the LED driver board 13 is formed of a thermally conductive, electrically insulating material, such as a thermally conductive, electrically insulating plastic.

Figure 10A:
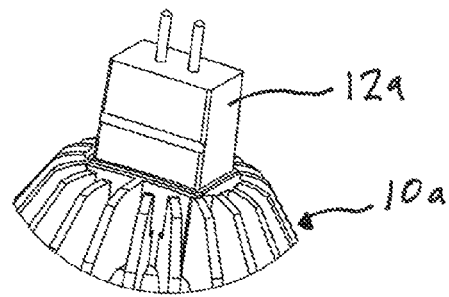
FIGS. 10A-10C illustrate several exemplary alternative embodiments of the LED lighting device.
Figure 10B:
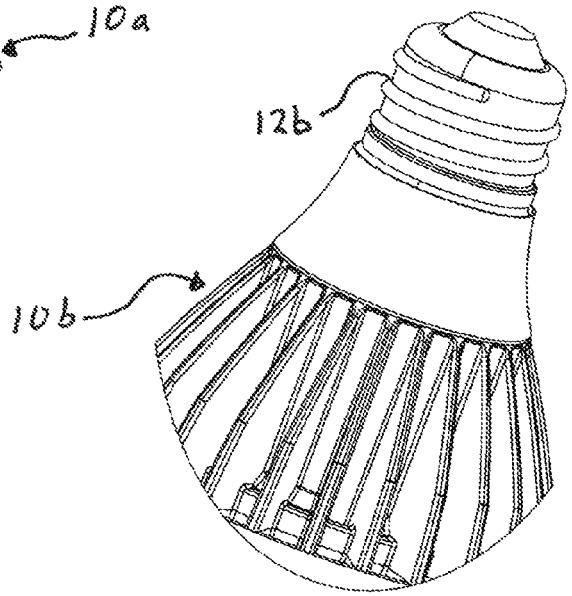
Figure 10C:
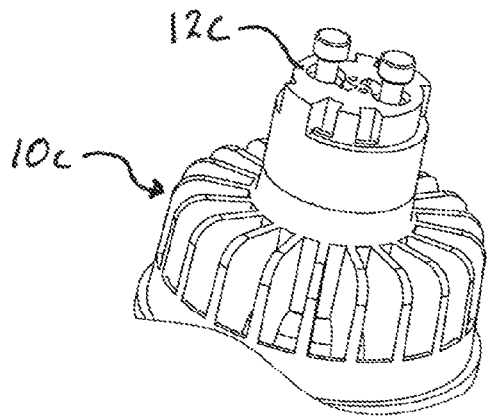

In some cases, the module 13 may include the connector 12 for connection of the LED lighting device 10 to a lighting fixture. Alternatively, the connector 12 for connection to a light fixture may be a separate module. In the depicted embodiment, the connector 12 is shown as a GU type connector. It will be recognized that any other connector for connecting the LED lighting apparatus to a light fixture may be employed. For example, FIG. 10A illustrates a second embodiment LED apparatus 10a having a Bi-Pin GU5.3 low voltage connector 12a. FIG. 10B illustrates a third embodiment LED apparatus 10b having an Edison base 12b. FIG. 10C illustrates a fourth embodiment LED lighting apparatus 10c having a GU10 for 110 or higher voltage connection.

The circuit board 11 includes a connector 14 for electrically coupling the drive board module 13 to the connector 15 on the circuit board module 16. In the depicted preferred embodiment, the drive board module 13 includes a protrusion 35 which is received within a complimentary opening 33 in the circuit board 16, e.g., to provide a snap fit, friction fit, or the like. In an especially preferred embodiment, the protrusion 35 may include a ramped or inclined surface which facilitates insertion of the protrusion into the opening 33, but which prevents or resists removal once it is snapped into place.

The circuit board 11 may also include connector pins or Edison base 12 for coupling the drive board module 13 to an external power supply such as the power supply (AC mains) of a building, a mating connection in a lighting fixture, etc. Connector pins or Edison base 12 protrude from, are connected through or are electrically insulated by the driver module housing material 27.

The circuit board may also carry any other electronics associated with the drive board module 13 and/or the LED device 10, as would be understood by persons skilled in the art. The circuit board 11 may be, for example, a glass/epoxy printed circuit board. Alternatively, the circuit board 11 may be a thermally conductive extrudable or injection moldable polymer. More preferably, the circuit board 11 may be an aluminum or other metal core printed circuit board of a type that may advantageously be used to conduct heat away from the drive electronic components mounted on the circuit board 11 and subsequently, through the physical connections, conduct heat away from the LED elements 17.

The LED device 10 is powered by an external power source, as described above. During operation, the LED light element 17 creates heat which is conducted by the LED heat slug 26 and other components in the thermal pathway of the LED light source to the bottom side 24 of the circuit board 16. The heat is conducted through the circuit board, through all the junctions between the peripheral portion 22 of the circuit board 16 and the heat sink/housing 18 and is dissipated by the heat sink housing 18 and the cooling fins 21 of the housing 18. By overmolding the peripheral portion 22 of the circuit board 16 with the injection moldable thermally conductive enclosure 18 in the injection molding process, the need for a separate interface material 131 (see FIG. 1) and the resulting temperature increase across the resulting interfacial or contact resistances is eliminated, thus creating a direct and thermally efficient path for the heat to travel to the heat sink housing 18 and be dissipated by the cooling fins 21. This resulting elimination of a thermal interface material can improve the heat transfer efficiency by, for example, between 1.5% and 10% and preferably between 2% and 30%, eliminating for example, 1 to 10 degrees Celsius from the junction temperature of the LED 17.

The LED device 10 also includes a lens or cover 19, which may act as a cover to the opening 23 of the LED device 10, and may also act as a diffuser, a lens to focus the light generated by the LED elements 17 into a desired beam angle and light arrangement, etc. In certain embodiments, the lens 19 may have a coating on the surface comprised of quantum dots which allow the lens to convert white LED light to warm LED light.

The LED lens 19 is received within the opening 23 such that any optical elements thereon are aligned over the LED elements 17. The lens 19 may be adapted to snap into place with snap features (e.g., 37, 39) designed into the part and corresponding openings 34, e.g., which may be formed as part of the injection molding manufacturing assembly process. Alternatively, the lens can be can be held in place by a snap ring or bezel (not shown) that fits over the lens 19 which in turn attaches to or snaps onto the LED device 10. In some instances, the LED lens may be formed directly onto the LED element 17 during its manufacture and built into the LED light source directly. In such cases, an additional protective lens 19 could optionally be added if so desired.

In a further aspect, an intermediate or sub assembly component is provided, comprising the circuit board 16 with the thermally conductive injection molded heat sink housing overmolded thereon, thus forming an subassembly which can be used to form a completed LED lighting apparatus. This embodiment could optionally omit some or all of the snap features and molded in tabs, guides and features, etc., to assemble all the remaining components and sub-assemblies thereto, while still providing all of the enhancements and improvements with respect to reduction or elimination of junction resistances between the LED circuit board module and the heat sink housing leading to improvements in the LED lighting device thermal performance, reliability, part-to-part variation and significant first cost, cost reductions to the consumer. To the extent some or all of the snap features and molded in tabs, guides and features, etc. are eliminated, the assembly in accordance with this embodiment could be taken and assembled via traditional assembly techniques to mount the remaining components such as lens if desired, bezels, driver electronics modules and Edison or other socket connectors for connecting the lighting device with the power sources, and so forth.

With respect to the prior art manufacturing methods, LED lighting devices are made up of many components manufactured all over the world which in turn are shipped to assembly locations where they are hand assembled into lighting devices. This generates a significant amount of reliability, repeatability, assembly, shipping and manufacturing costs and inefficiencies that must not only be built into the LED device costs but also results in a LED device design that is thermally inefficient and unreliable. The device and manufacturing method in accordance with the present disclosure provides for a streamlined LED device design with a manufacturing method that simplifies and automates the whole manufacturing assembly process of the LED device into one step.

For example, a design in accordance with an exemplary embodiment of this disclosure of a circuit board module that is designed to have its periphery be overmolded with a thermally conductive injection moldable material forming the housing, includes a connector protruding from it, e.g., on an inward facing side of the circuit board, for a drive electronics module to snap on and connect onto one side, e.g., via the cavity 29, of the injection molded thermally conductive housing. The housing, in turn, may have integrally molded features to accept a lens and cover to snap on to it from the other side. In this manner, the number of components and steps to assemble the LED luminaire can be significantly reduced, e.g., from typically as many as 10 or more to 4 or fewer. By using an injection moldable thermoplastic material as the housing and heat sink as well as the fastener system that holds all the modules together in the device, it is possible to eliminate some or all of the secondary external mechanical fasteners such as screws, wires, rivets, clips, pawls, and other similar fastening components.

In accordance with an additional embodiment, it is further contemplated a circuit board module overmolded with a thermally conductive injection moldable material may be provided without some or all of the integrally molded snap features, thus forming an assembly of the thermally conductive housing overmolded with the LED circuit board module, which may then be assembled to a completed luminaire using known assembly methods. This embodiment would not have all the snap features and molded in tabs, guides and features to assemble all the remaining components and sub-assemblies to. However, this embodiment would contain all the enhancements and improvements in terms of reducing or eliminating junction resistances between the LED circuit board module and the heat sink housing, thus leading to improvements in the LED lighting device thermal performance, reliability, part-to-part variation, and significant first cost reductions to the consumer. This overmolded assembly could then be taken and assembled via traditional or known assembly techniques to mount the remaining components such as lens (if desired) bezels, driver electronics modules and Edison, GU-type, or other socket connectors for connecting the lighting device with a power source.

Figure 11:
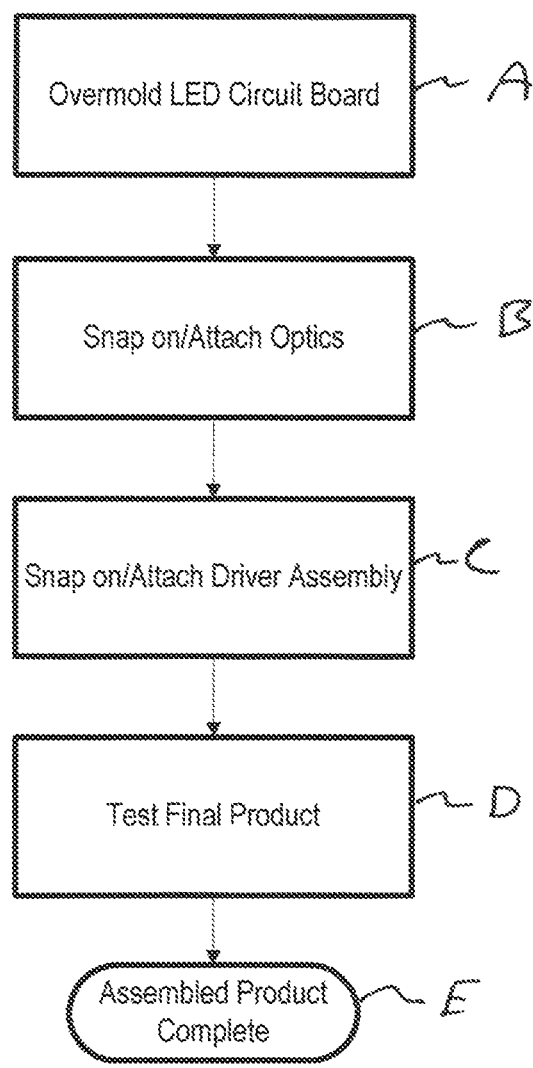
FIGS. 11 and 12 are process flow charts of a manufacturing method in accordance with an exemplary embodiment of the present disclosure.

FIG. 11 depicts a preferred method of manufacturing an LED lighting device 10 in accordance with this disclosure. Referring to the process map of the preferred method shown in FIG. 12, there appears a pre-defined process step A comprising overmolding the LED circuit board with the moldable thermally conductive material. At step B, the lens/optics component is attached, e.g., by snapping on or otherwise attaching using a quick connect methods. At step C, the driver assembly component is attached, e.g., via snap on features or other quick connection technique. At step D, the LED product is tested and at step E, the assembled product and is ready for packaging.

Figure 12:
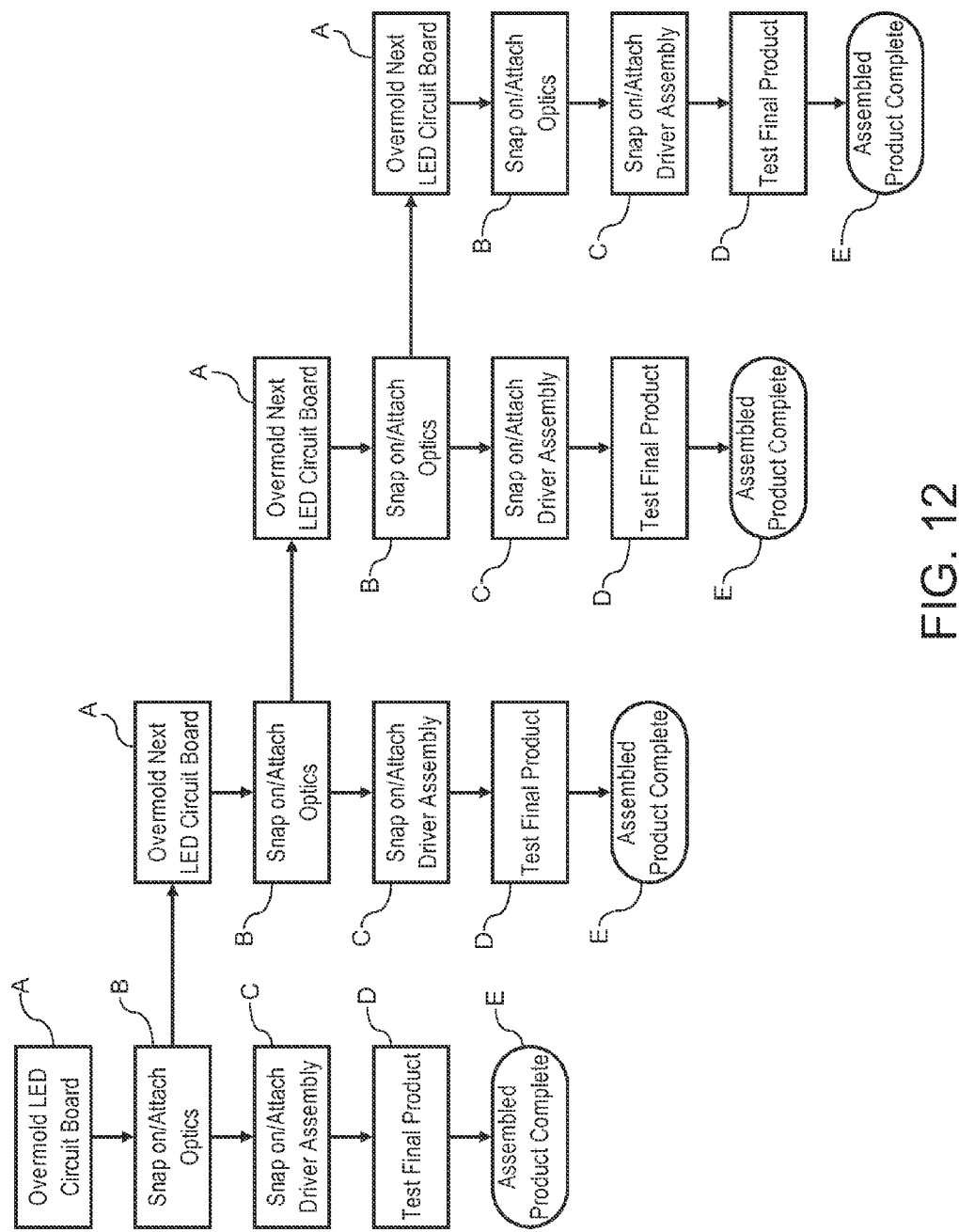

Referring now to FIG. 12, there appears a preferred method which may be embodied using an advanced automated manufacturing cell built in-line with the injection molding process, e.g., operating under preprogrammed control, in which the thermally conductive heat sink housing is overmolded onto the LED circuit board so that a complete LED luminaire 10 can be overmolded and assembled during the cycle time of overmolding the LED circuit board 16. In this manner, for every molding cycle, a complete, tested luminaire is produced. It will be recognized, however, that manual transfer and assembly of the partially completed work product between some or all of the process steps is also contemplated.

The work cells utilized in the manufacturing line in accordance with the preferred method herein may be optimized for the process steps. Their functions in accordance with this embodiment are described in greater detail below. In step A, incoming materials i.e. the LED boards 16, are pre-loaded onto material handling trays and presented to the injection molding machine where they are presented, e.g., via automated control systems, to an injection molding machine robot (e.g., a robotic arm) capable of gripping incoming material, i.e., the LED boards 16 as well as the finished overmolded housing assembly.

After the overmolding process is complete and the injection moldable thermally conductive material forming the heat sink housing 18 is overmolded onto the PCB assembly 16, the intermediate housing/circuit board assemblies so produced are presented to the second process step, B, e.g., via automated processes and handling. Step B represents the second pre-defined process step where a preliminary test to verify the function of the LED's may optionally be performed and wherein the optics/lens 19 is attached and snapped onto the overmolded LED housing, preferably automatically under programmed control.

The parts are then presented to pre-defined process C where the driver sub-assembly 13 (including housing and socket/screw base) is attached to a functional overmolded luminaire/lens assembly using advanced modular connectors and automated assembly processes. Next, the completed assemblies 10 are presented to pre-defined station D where final inspection is performed. Completed, passed, luminaires 10 are presented for product packaging and shipping at pre-defined process E.

Each pre-defined process step is preferably designed to take no longer than the first process step A. This results in a completed luminaire 10 being produced every time the overmolding process A occurs, once the whole process has commenced and the first product reaches step E. Process steps A, B, C, and D may also include process steps relating to injection molding preparation, including but not limited to injection molding design and fabrication, Injection molding machine selection, heat sink housing final part design for mold design of injection mold to overmold. The process steps may also include the use of any automation or tooling required for holding or handling the modules that are used and assembled during the injection molding process as would be understood by persons skilled in the art. Many injection molding cells include robots which pick up components, place them in molds, present them to operators or conveyors after product manufacture completion.

The process steps A, B, C, and D may also refer to any robotic activity and end of arm tooling related to handling of components, staging areas for module assemblies and components as well as any programming of injection molding machines for process control, robotic automation handling programs and any other general automation or processes generally associated with the injection molding process and automation handling as would be understood by persons skilled in the art.

Utilizing an assembly method in accordance with this disclosure of injection molding allows for the full assembly of the LED device design in accordance with this disclosure in one operation in an automated fashion. Injection molding allows a variety of in-mold assembly techniques today. The technology and capability of automation, two shot molding, insert molding and in-mold assembly allows for the manufacture of a complete part within the molding cycle and process. Significant manufacturing cost savings can be obtained by eliminating and consolidating components and minimizing handling and assembly steps. In certain embodiments, using preassembled circuit boards, lenses and other desired modules, these components are placed into the injection mold. Using 1 or 2 shot molding (e.g., optionally, the lens may also be molded at this time) the circuit board is overmolded with a thermally conductive housing material to form the heat sink. Using automation and new in-mold assembly technology the lens, modules and any other desired connectors or components may be attached to the light to produce a completed LED luminaire, thereby significantly cutting down on manufacturing and assembly costs.

For example, if the manual assembly of an LED device takes 5 minutes at a rate of $10 USD per hour, the manufacturing assembly cost would be $0.83 per device. Using injection molding as the baseline assembly and overmold technique, assuming a 4-cavity mold running a 30-second cycle time at a machine rate of $100 USD per hour, the assembly cost per device would be $0.21 per device or just ¼ of the cost. The automated assembly method coupled with the elimination of the variation of junction resistance between the circuit board 16 and the LED device housing 18 also increases the product reliability, which significantly reduces the warranty costs, which is a significant cost factor in today's LED devices.

In an alternative embodiment of the LED device manufacture method, the mold designed in pre-defined process A has four sides for performing operations in it. During the molding process, the mold opens and then rotates 90 degrees where a second operation occurs. A four-sided mold can therefore have four operations. For example after overmolding the LED circuit board module during the first molding shot and rotating, mating mold components and tooling press and snap fit the drive electronics module into the overmolded heat sink housing and circuit board module. This then continues on all sides until all assembly is complete and a robot or other device removes a completely assembled LED lighting device from the mold after the final molding cycle.

In yet another alternative embodiment the LED circuit board module is overmolded with a thermally conductive injection moldable material that integrates all mounting features for the remaining LED module sub assemblies and components to fit into. This sub assembly is then transferred to secondary assembly stations outside the injection molding cell where the drive electronics board and LED lens/cover are assembled exactly into place.

In yet another alternative embodiment there is no separate LED circuit board module. Instead, the circuit and LED are mounted directly onto the injection moldable heat sink housing after the housing has been injection molded. In this embodiment, the housing can incorporate all mounting features and assemblies to any sub assemblies and components during the injection molding process. Furthermore, the PCB may be eliminated and the circuits placed directly on the heat sink housing, in which case the unit undergoes an additional step of mounting the LEDs directly thereon after the other assembly processes are complete.

Some LED device designs may have more component sub assemblies while others will have less. The embodiments herein are intended to be exemplary and illustrative only and modifications may become apparent to persons skilled in the art upon reading and understanding of the present disclosure.

In an alternative embodiment, a hybrid heat sink method may be utilized. In this method, a metal or other heat sink spreader or insert may be inserted into the mold along with the circuit board module, whereby the spreader acts as the heat sink/thermal sinking device. The injection moldable housing material in this case may be thermally conductive plastic, any metal injection moldable material or even a non-thermally conductive, conventional plastic that is utilized to incorporate the mounting and assembling of all components, yet utilizes the metal heat sink spreader as the heat sink for the LED light sources.

In still further alternative embodiments, the circuit board of the drive electronics module can be combined onto the circuit board of the LED devices. In this case, only leads, a connector for connecting to a power source and a connector housing material are connected to the circuit board 16. This is typically the case when the LEDs are AC LEDs and can take direct line voltage without requiring special drive electronics to step down the AC line voltage coming from the power source and converting it to DC to drive the DC LEDs. Those skilled in the art will would recognize drive electronics requirements with respect to the various LED types and powering options.

By using AC LED technology in certain embodiments, the drive electronic costs can be significantly reduced by between 20-30%, preferably between 10-40% of the total electronic costs of the LED device 10. Eliminating this electronic driver not only reduces cost, but it also increases available part volume that can be utilized by the heat sink and thermal material to further dissipate heat from the LED by a significant factor. This boosts the efficiency of the LED device 10, lowering its temperature and thereby significantly increasing its reliability.

The invention has been described with reference to the preferred embodiments. Modifications and alterations will occur to others upon a reading and understanding of the preceding detailed description. It is intended that the invention be construed as including all such modifications and alterations. It is to be understood that the foregoing descriptive matter is to be interpreted merely as illustrative of the invention and not as a limitation.

Having thus described the preferred embodiments, the invention is now claimed to be:

1. An LED lighting apparatus, comprising:
   an electronic circuit board having a peripheral portion and a central portion that is radially inward of said peripheral portion, said electronic circuit board having an exterior side for optically interfacing with ambient environment during operation and an interior side opposite the exterior side;
   at least one LED mounted on the exterior side of the electronic circuit board central portion;
   a thermally conductive housing enclosing said electronic circuit board, said thermally conductive housing formed of a moldable thermally conductive material;
   said thermally conductive housing together with the exterior side of the electronic circuit board cooperating to define a first cavity, said first cavity proximate adjacent the central portion of the electronic circuit board exterior side; and
   said thermally conductive housing together with the interior side of the electronic circuit board cooperating to define a second cavity, said second cavity proximate the central portion of the electronic circuit board interior side, a portion of said thermally conductive housing being overmolded onto said peripheral portion.

2. The LED lighting apparatus of claim 1, wherein said moldable thermally conductive material is a thermally conductive plastic.

3. The LED lighting apparatus of claim 1, further comprising:
   an LED driver received within said second cavity.

4. The LED lighting apparatus of claim 3, further comprising:
   an electrical connector on said electronic circuit board for mating with a complimentary electrical connector on said LED driver to electrically couple said LED driver to said at least one LED.

5. The LED lighting apparatus of claim 3, wherein said LED driver includes an LED driver housing enclosing an LED driver circuit board, said LED driver housing formed of a thermally conductive, electrically insulating plastic.

6. The LED lighting apparatus of claim 1, further comprising:
   said first cavity defining an opening; and
   a lens affixed about said opening.

7. The LED lighting apparatus of claim 6, wherein said lens is selected from a transparent plate, an optical diffuser, and an optical beam shaper.

8. The LED lighting apparatus of claim 6, wherein said lens has a coating on the surface comprised of quantum dots which allow the lens to convert white LED light to warm LED light.

9. The LED lighting apparatus of claim 1, wherein said electronic circuit board is a printed circuit board.

10. The LED lighting apparatus of claim 9, wherein said printed circuit board is a metal core printed circuit board.

11. The LED lighting apparatus of claim 10, further comprising:
a thermal slug mounted on the exterior side of said electronic circuit board and adjacent each of said at least one LED and in thermal communication with said metal core printed circuit board.

12. The LED lighting apparatus of claim 9, wherein said printed circuit board is a non-metallic printed circuit board.

13. The LED lighting apparatus of claim 12, further comprising:
a heat spreader plate adjacent the interior side of the electronic circuit board, said heat spreader plate in thermal communication with said at least one LED, wherein a portion of said thermally conductive housing is overmolded onto a peripheral portion of said heat spreader plate.

14. The LED lighting apparatus of claim 13, further comprising:
a thermal slug mounted on the exterior side of said electronic circuit board and adjacent each of said at least one LED and in thermal communication with said heat spreader plate.

15. The LED lighting apparatus of claim 1, wherein the moldable thermally conductive material comprises a polymer matrix material and a thermally conductive filler.

16. The LED lighting apparatus of claim 15, wherein the thermally conductive filler is selected from the group consisting of natural and synthetic graphite, carbon fiber, carbon black, boron nitride, aluminum nitride, silicon nitride, silicon oxide, metal oxides, and combinations thereof.

17. The LED lighting apparatus of claim 15, wherein the moldable thermally conductive material is electrically conductive.

18. The LED lighting apparatus of claim 15, wherein said moldable thermally conductive material is electrically insulating.

19. A method of manufacture, comprising:
providing an electronic circuit board having a peripheral portion and a central portion that is radially inward of said peripheral portion, said electronic circuit board having an exterior side for optically interfacing with ambient environment during operation and an interior side opposite the exterior side;

mounting at least one LED mounted on said exterior side of the electronic circuit board central portion; and overmolding said electronic circuit board peripheral portion with a moldable thermally conductive material to form an overmolded thermally conductive housing enclosing said electronic circuit board, said thermally conductive housing together with the exterior side of the circuit board cooperating to define a first cavity, the first cavity proximate the central portion of the electronic circuit board exterior side and said thermally conductive housing together with the interior side of the electronic circuit board cooperating to define a second cavity, the second cavity proximate the central portion of the electronic circuit board interior side.

20. The method of manufacture of claim 19, wherein said moldable thermally conductive material comprises a polymer matrix material and a thermally conductive filler.

21. The method of manufacture of claim 20, wherein said moldable thermally conductive material is electrically conductive.

22. The method of manufacture of claim 20, wherein said moldable thermally conductive material is electrically insulative.

23. The method of manufacture of claim 19, wherein said overmolding is an injection overmolding.

24. The method of claim 19, wherein said step of mounting said at least one LED on said exterior side of the electronic circuit board central portion is performed prior to said step of overmolding said electronic circuit board peripheral portion with a moldable thermally conductive material.

25. The method of claim 19, further comprising:
attaching an optically transparent cover over said circuit board exterior side using a fastener integrally formed on said overmolded thermally conductive housing.

26. The method of claim 19, further comprising:
electrically coupling an LED driver electronics module to said electronic circuit board.

27. The method of claim 26, wherein the LED driver electronics module is attached to the overmolded thermally conductive housing a fastener integrally formed on said overmolded thermally conductive housing.

* * * * *